United States Patent
Zhang et al.

(10) Patent No.: US 11,889,419 B2
(45) Date of Patent: Jan. 30, 2024

(54) METHOD AND DEVICE FOR PROCESSING INSTANT APPLICATION MESSAGES

(71) Applicant: MediaTek Singapore Pte. Ltd., Singapore (SG)

(72) Inventors: Zhuoliang Zhang, Beijing (CN); Cunliang Du, Beijing (CN); Chao Song, Beijing (CN); Zhen Jiang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 340 days.

(21) Appl. No.: 17/487,085

(22) Filed: Sep. 28, 2021

(65) Prior Publication Data

US 2023/0017056 A1    Jan. 19, 2023

(30) Foreign Application Priority Data

Jul. 16, 2021    (CN) .......................... 202110804859.8

(51) Int. Cl.
*H04W 52/02*    (2009.01)
*H04M 1/72421*    (2021.01)
*H04L 51/046*    (2022.01)
*H04W 4/12*    (2009.01)

(52) U.S. Cl.
CPC ....... *H04W 52/0229* (2013.01); *H04L 51/046* (2013.01); *H04M 1/72421* (2021.01); *H04W 4/12* (2013.01)

(58) Field of Classification Search
CPC ............... H04W 52/0229; H04W 4/12; H04M 1/72421; H04L 51/046

USPC .......................................................... 709/206
See application file for complete search history.

(56) References Cited

U.S. PATENT DOCUMENTS

| | | | |
|---|---|---|---|
| 9,401,130 B2 | 7/2016 | Gunn et al. | |
| 10,104,618 B2 | 10/2018 | Lin et al. | |
| 10,936,047 B2 | 3/2021 | Chen et al. | |
| 2017/0339640 A1* | 11/2017 | Krishnamoorthy | H04W 52/0225 |

FOREIGN PATENT DOCUMENTS

| | | | |
|---|---|---|---|
| CN | 101990283 A | * | 3/2011 |
| CN | 101990283 A | | 3/2011 |
| CN | 108052272 B | | 4/2021 |

(Continued)

OTHER PUBLICATIONS

Chinese language office action dated Jan. 10, 2022, issued in application No. TW 110129372.

*Primary Examiner* — James E Springer
(74) *Attorney, Agent, or Firm* — McClure, Qualey & Rodack, LLP

(57) ABSTRACT

A method for processing instant application messages is provided. The method is performed by a device and includes: receiving, by a modem of the device, an instant application message transmitted from an application server to an application processor of the device; determining, by the modem, whether the application processor is in a sleeping mode and the instant application message is an emergency message; and transmitting, by the modem, the instant application message to a co-processor of the device to cache the instant application message when the application processor is in the sleeping mode and the instant application message is not an emergency message.

20 Claims, 8 Drawing Sheets

(56) References Cited

FOREIGN PATENT DOCUMENTS

| | | | |
|---|---|---|---|
| EP | 3 119 033 B1 | | 11/2018 |
| KR | 20140061483 A | * | 5/2014 |
| TW | I519188 B | | 1/2016 |

* cited by examiner

METHOD AND DEVICE FOR PROCESSING INSTANT APPLICATION MESSAGES

CROSS REFERENCE TO RELATED APPLICATIONS

This application claims priority from China Patent Application No. 202110804859.8, filed on Jul. 16, 2021, the disclosure of which is incorporated herein by reference in its entirety.

BACKGROUND

Technical Field

The present disclosure generally relates to the field of wireless communication technology. More specifically, aspects of the present disclosure relate to a method and device for processing instant application messages.

Description of the Related Art

With the rapid development of mobile devices, users use mobile devices more and more frequently, and more and more applications need to be installed to meet the user's needs in different aspects. Examples include instant communication applications, shopping applications, and social media applications. These applications all need to communicate with their corresponding servers to keep the data synchronized.

Currently, most mobile devices are based on an application processor (AP) and modem modes. As shown in FIG. 1, the modem 114 in the mobile device 110 is responsible for data communication with the application server 120 of the corresponding application through the network 130, to receive data packets and forward data packets to the application processor 112 in the mobile device 110, or to forward data packets transmitted by the application processor 112 to the application server 120.

In the prior art, when different applications in the mobile device 110 are connected with the application server 120 in a heartbeat connection, the modem 114 and the application processor 112 on the mobile device 110 are both awakened to jointly complete the heartbeat task. A general instant communication application needs to periodically send heartbeat packets to the application server 120 by a push service to maintain an online state of the application. Therefore, a timer needs to be set in the application processor 112 to ensure that the heartbeat packet may still be transmitted to the application server 120 even when the application processor 112 is in a sleeping mode.

The application processor 112 may transmit periodic heartbeat packets without entering the sleeping mode, or the application processor 112 in the sleeping mode may be frequently woken up to transmit periodic heartbeat packets. On the other hand, the application processor 112 in the sleeping mode may also be frequently awakened to process messages from the application server 120. The situations mentioned above may cause the mobile device 110 to consume a large amount of power and shorten the standby time of the mobile device 110.

Therefore, there is a need for a method and a device for processing instant application messages to effectively reduce the number of times the mobile device is awakened and reduce power consumption.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a device for processing instant application messages to overcome the above disadvantages.

In an exemplary embodiment, a method for processing instant application messages is provided, wherein the method is performed by a device and comprises: receiving, by a modem of the device, an instant application message transmitted from an application server to an application processor of the device; determining, by the modem, whether the application processor is in a sleeping mode and the instant application message is an emergency message; and transmitting, by the modem, the instant application message to a co-processor of the device to cache the instant application message when the application processor is in the sleeping mode and the instant application message is not an emergency message.

In some embodiments, the method further comprises: determining, by the co-processor, whether the number of instant application messages that have been cached in the co-processor exceeds a threshold; and pushing, by the co-processor, the cached instant application messages to the application processor when the number of instant application messages exceeds the threshold.

In some embodiments, before the co-processor determines whether the number of instant application messages that have been cached in the co-processor exceeds the threshold, the method further comprises: determining whether the instant application message is a heartbeat response; sending, by a sending proxy of the co-processor, a heartbeat packet to the application server through the modem while the application processor is in the sleeping mode when the instant application message is a heartbeat response; or caching, by the co-processor, the instant application message to the message cache in the co-processor when the instant application message is not a heartbeat response.

In some embodiments, the method further comprises: operating, by the co-processor, one of the components of the device to notify a user of the instant application information when the application processor is in the sleeping mode.

In some embodiments, the method further comprises: receiving, by a sending proxy of the co-processor, a packet mode configuration transmitted by the application processor; and sending, by the sending proxy, a heartbeat packet back to the modem according to the packet mode configuration when the application processor is in the sleeping mode.

In some embodiments, the modem has a whitelist filter that records an emergency message mode; and wherein when the instant application message passes through the whitelist filter, the modem determines that the instant application message is an emergency message.

In some embodiments, when the application processor is not in the sleeping mode, the method further comprises: directly transmitting, by the modem, the instant application message to the application processor; and transmitting, by the application processor, the instant application message to an application (APP).

In some embodiments, when the instant application message is an emergency message, the method further comprises: waking up the application processor by the modem; and sending the instant application message to the application processor.

In some embodiments, the method further comprises: transmitting, by the co-processor, synchronization proxy information to the application processor through a callback function when the application processor is awakened from the sleeping mode; generating, by a fixup agent of the application processor, a protocol serial number balance according to the synchronization agent information; and pushing, by the co-processor, the cached instant application message to the application processor; wherein the protocol serial number balance is used to enable a transmission control protocol (TCP) stack to continue to communicate with the application server after the processor is awakened from the sleeping mode. In some embodiments, the fixup agent is implemented in a NIC driver.

In some embodiments, the method further comprises: regardless of whether the application processor is in the sleeping mode, the co-processor transmits a heartbeat packet to a proxy socket of the application or receives the heartbeat packet transmitted from the proxy socket through the transmission control protocol (TCP) stack without passing through the application processor, wherein the proxy socket is provided by a software development kit (SDK) application programming interface (API); and the co-processor pushes the cached instant application message to the application processor after the application processor is awakened from the sleeping mode.

In an exemplary embodiment, a device for processing instant application messages comprises: a modem; an application processor, coupled to the modem; and a co-processor, coupled to the modem and the application processor; wherein the modem receives an instant application message transmitted from an application server to the application processor; the modem determines whether the application processor is in a sleeping mode and the instant application message is an emergency message; and the modem transmits the instant application message to the co-processor to cache the instant application message when the application processor is in the sleeping mode and the instant application message is not an emergency message.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

This description is made for the purpose of illustrating the general principles of the invention and should not be taken in a limiting sense. The scope of the invention is best determined by reference to the appended claims.

The following description is presented to enable one of ordinary skill in the art to make and use the disclosure and is provided in the context of a patent application and its requirements. Various modifications to the preferred embodiments and the generic principles and features described herein will be readily apparent to those skilled in the art. Therefore, the present invention is not intended to be limited to the embodiments shown, but is to be accorded the widest scope consistent with the principles and features described herein.

Multiple implementation manners are provided in the present disclosure. Two embodiments are used to describe the two main implementation manners of the present disclosure below. The first embodiment is an implementation in which the application processor includes a fixup agent. The second embodiment is an implementation in which the application processor does not include a fixup agent, wherein the TCP stack is implemented by a co-processor in the second embodiment. The first embodiment will be described first.

First Embodiment

Figure 1:
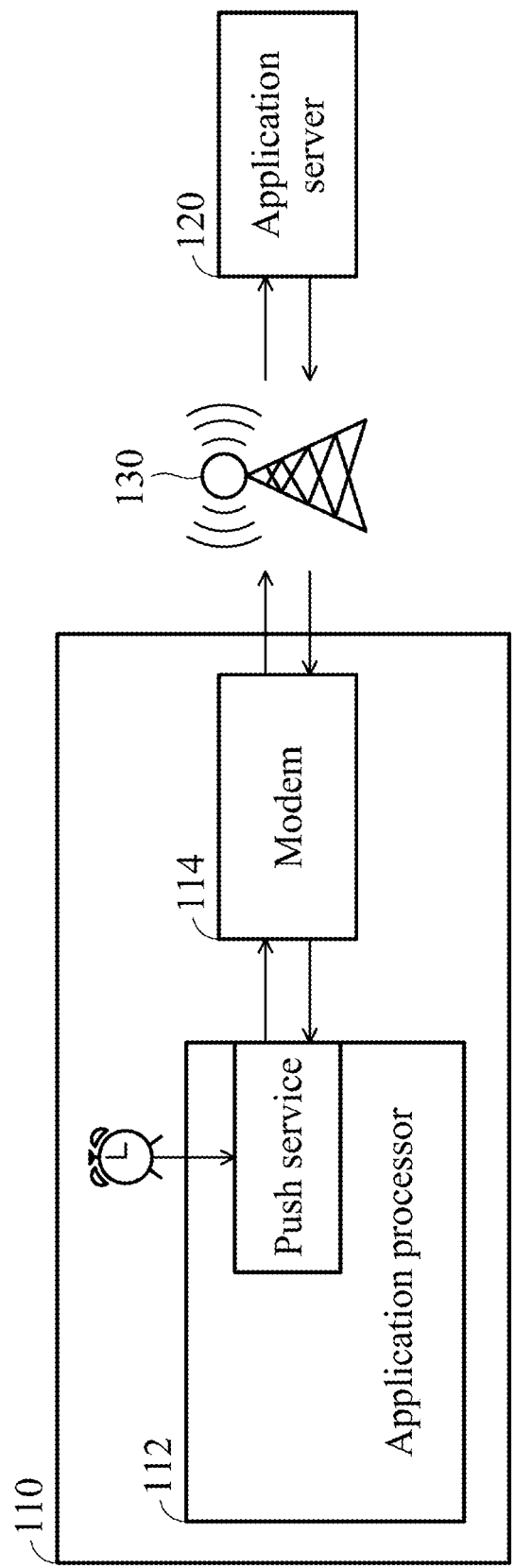
FIG. 1 is a schematic diagram illustrating data communication between a modem of a mobile device and an application server of a corresponding application.
Figure 2:
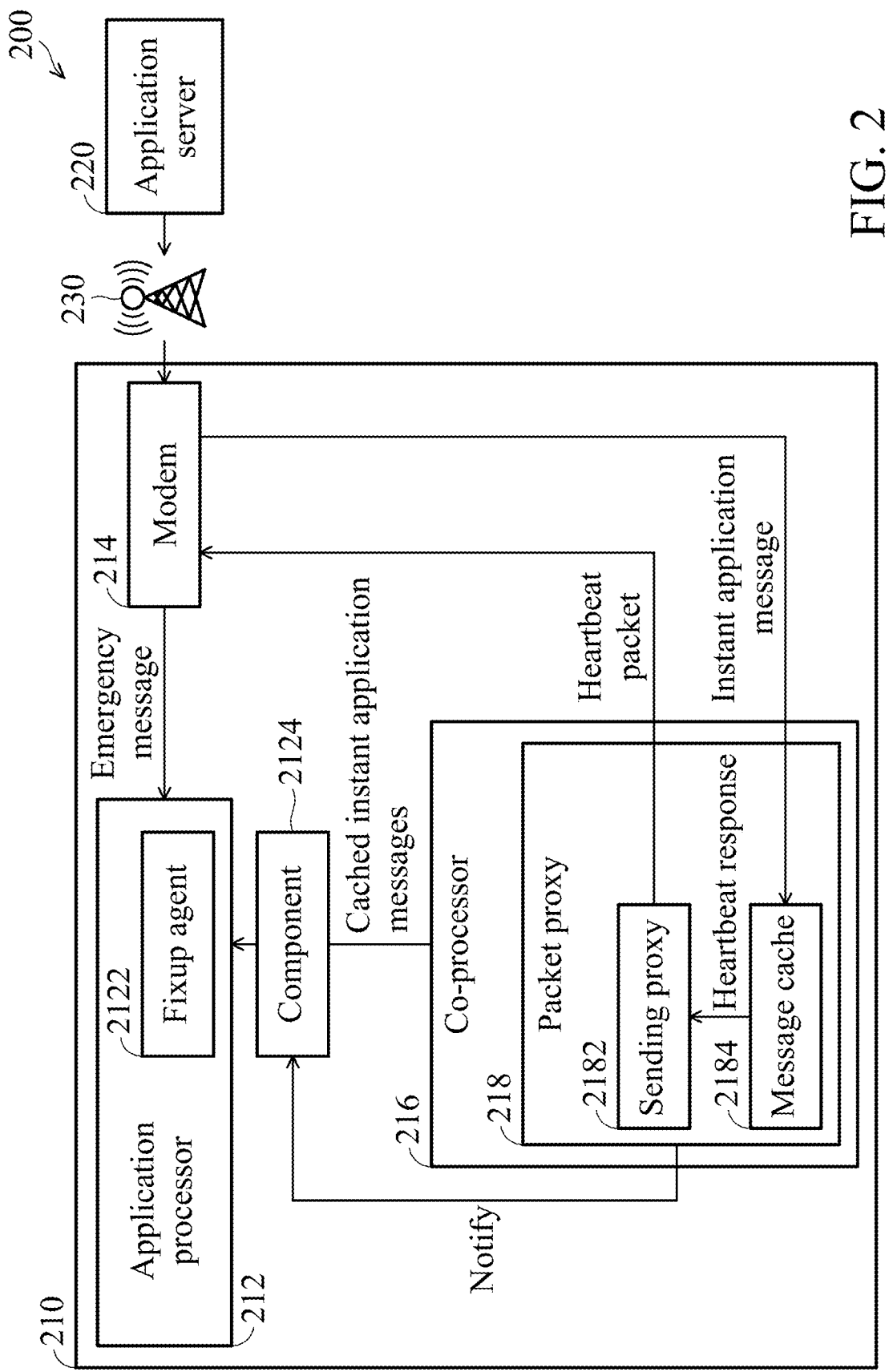
FIG. 2 is a schematic diagram illustrating a system 200 for processing instant application messages according to the first embodiment of the present disclosure.

FIG. 2 is a schematic diagram illustrating a system 200 for processing instant application messages according to the first embodiment of the present disclosure. As shown in FIG. 2, the system 200 for processing instant application messages comprises an electronic device 210 and an application server 220 communicating with the electronic device 210 via a network 230.

The networks 230 can be provided as wired and/or wireless networks, and may include a packet-based network, such as a transmission control protocol/Internet protocol (TCP-IP) network. The networks 230 may include a local area network (e.g., an intranet), a wireless local area network (WLAN) or Wi-Fi network, a Third Generation (3G) or Fourth Generation (4G) mobile telecommunications network, a wide area network, the Internet, or any appropriate combination thereof.

The electronic device 210 may at least comprise an application processor (AP) 212, a modem 214, and a co-processor 216. The application processor 212 is coupled to the modem 214, and the co-processor 216 is coupled to the modem 214 and the application processor 212.

It can be understood that the electronic device 210 shown in FIG. 2 is an example of one suitable system 200 for processing instant application messages architecture. Each of the components shown in FIG. 2 may be implemented via any type of computing device, such as the computing device 800 described with reference to FIG. 8, for example.

The co-processor 216 is a low-power central processing unit (CPU) and comprises a packet proxy 218, wherein the packet proxy 218 comprises a sending proxy 2182 and a message cache 2184.

Before the application processor 212 enters the sleeping mode, the application processor 212 transmits the packet mode configuration to the sending proxy 2182, wherein the packet mode configuration may at least comprise a packet format (such as a heartbeat packet format), a response format, and five-tuples information and a transmission cycle. When the application processor 212 is in the sleeping mode, the sending proxy 2182 sends back the heartbeat packet to the modem 214 according to the packet mode configuration. The modem 214 then forwards the heartbeat packet to the application server 220 to maintain the network connection between the electronic device 210 and the application server 220. In addition, since the packet format is relatively fixed, the sending proxy 2182 does not need the protocol stack to construct the network packet independently.

When the application processor 212 is in the sleeping mode, the modem 214 receives an instant application message from the application server 220. The modem 214 determines whether the instant application message is an emergency message. When the instant application message is an emergency message, the modem 214 wakes up the application processor 212 and transmits the instant application message to the application processor 212. When the modem 214 determines that the instant application message is not an emergency message, the modem 214 transmits the instant application message to the message cache 2184 of the packet proxy 218 to cache the instant application message. The co-processor 216 may operate the component 2124 of the electronic device 200 to notify the user of the instant application message when the application processor is in a sleeping mode, wherein the component may be a hardware module operable by the co-processor 216 (for example, LED/audio/display/vibrator and other components).

In one embodiment, the modem 214 has a whitelist filter (not shown in the FIG. 2) that records an emergency message mode. The whitelist included in the whitelist filter includes functions and applications such as grab red envelopes, video calls, and clock reminders. When the instant application message passes through the whitelist filter, the modem 214 determines that the instant application message is an emergency message. Then, the modem 214 wakes up the application processor 212 and transmits the instant application message to the application processor 212. When the instant application message does not pass through the whitelist filter, the modem 214 determines that the instant application message is not an emergency message. The modem 214 does not wake up the application processor 212, and forwards the instant application message to the message cache 2184 of the co-processor 216 to be cached.

The instant application messages forwarded by the modem 214 to the message cache 2184 may be divided into two types, one is a heartbeat response, and the other is a general message packet. When the instant application message is a heartbeat response, the co-processor 216 transmits the instant application message which is a heartbeat response to the sending proxy 2182 so that the sending proxy 2182 may sends back the heartbeat packet to the modem 214 according to the packet mode configuration. When the instant application message is a general message packet, the co-processor 216 caches the instant application message in the message cache 2184.

The co-processor 216 may determine whether the number of instant application messages that have been cached in the message cache 2184 of the co-processor 216 exceeds a threshold. When the number of instant application messages has exceeded the threshold, the co-processor 216 may wake up the application processor 212 and push the cached instant application messages to the application processor 212. When the number of instant application messages does not exceed the threshold but the application processor 212 has been awakened, the co-processor 216 may immediately push the cached threshold application messages to the application processor 212.

The application processor 212 is a high-power central processing unit, and may comprise a fixup agent 2122. When the application processor 212 is awakened from the sleeping mode and before the transmission control protocol (TCP) stack starts to process the instant application messages, the co-processor 216 transmits the synchronization proxy information to the application processor 212 through a callback function. The fixup agent 2122 generates a protocol serial number balance according to the synchronization proxy information, wherein the protocol serial number balance is used to enable the TCP stack to continue to communicate with the application server 220 after the application processor 212 is awakened from the sleeping mode. When the co-processor 216 pushes the cached instant application messages to the application processor 212, the fixup agent 2122 needs to discard the TCP stack's responses to these cached messages, wherein these application message responses have been sent by the co-processor 216 during the sleep of the application processor 212.

Figure 3:
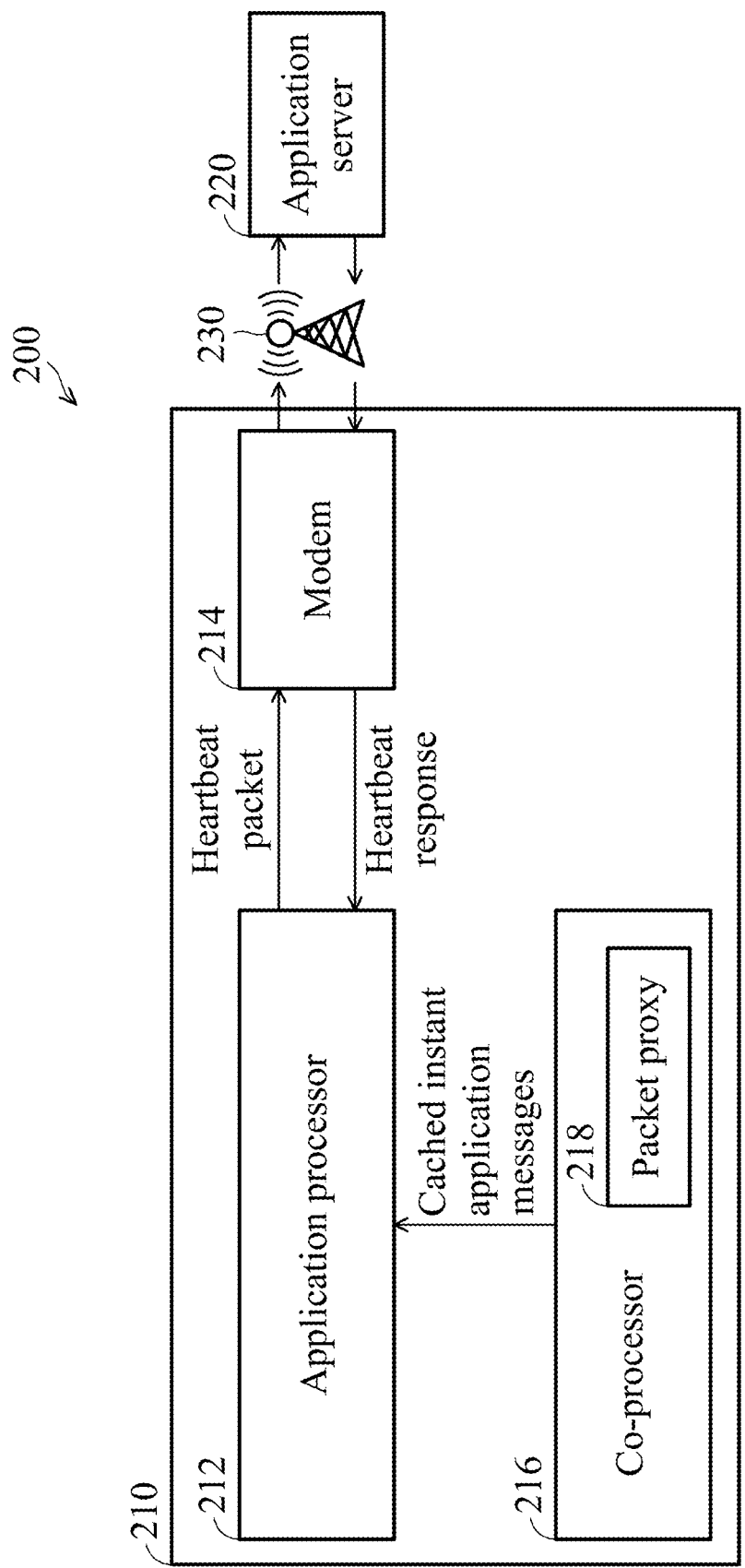
FIG. 3 is a schematic diagram illustrating the operation of the application processor being awakened from a sleeping mode according to the first embodiment of the present disclosure.

FIG. 3 is a schematic diagram illustrating the operation of the application processor being awakened from a sleeping mode according to the first embodiment of the present disclosure with reference to FIG. 2. The components having the same name as described in FIG. 3 and FIG. 2 have the same function, so details related to the functions of the components will be omitted. Once the application processor 212 is awakened from the sleeping mode, the application processor 212 may actively obtain the instant application messages cached in the message cache 2184, and then process the instant application messages according to the normal process. As shown in FIG. 3, the application processor 212 obtains the instant application messages cached in the message cache 2184, and transmits the heartbeat packet to the application server 220.

Figure 4:
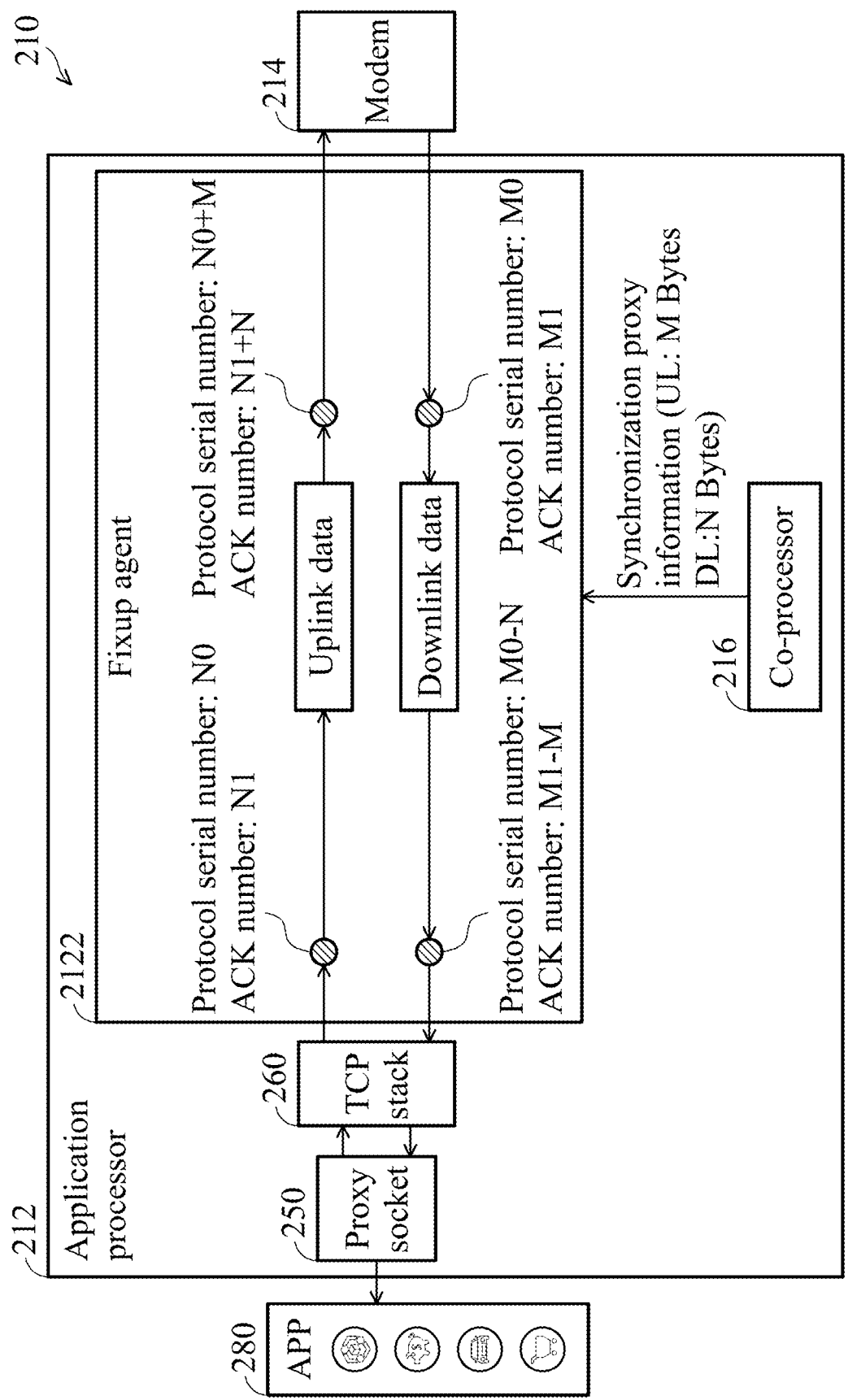
FIG. 4 is a flowchart illustrating the internal operation of the electronic device according to the first embodiment of the disclosure.

FIG. 4 is a flowchart illustrating the internal operation of the electronic device 210 according to the first embodiment of the disclosure with reference to FIG. 2. The components having the same name as described in FIG. 4 and FIG. 2 have the same function, so details related to the functions of the components will be omitted. As shown in FIG. 4, the fixup agent 2122 may be implemented between the TCP stack 260 in the application processor 212 and the application server. In one embodiment, the fixup agent is a modem network interface card driver (Modem NIC driver).

It is assumed that the co-processor 216 sends M-byte of data to the application server and receives N-byte data from the application server when the application processor 212 is in the sleeping mode. When the application processor 212 is awakened from the sleeping mode, the co-processor 216 transmits the synchronization proxy information (UL: M bytes, DL: N bytes) to the application processor 212 through a callback function.

As shown in FIG. 4, after the fixup agent 2122 receives the synchronization proxy information, the application processor 212 may add M to the protocol serial number of packet (for example, the serial number of TCP), and then transmit the packet to the application server when the application processor 212 transmits data through the proxy socket 250 of the application. When the application processor 212 responds to the application server due to the data sent by the application server, the application processor 212 may add N to the acknowledgment (ACK) number of packet, and then transmit the packet to the application server. In this way, the electronic device 210 and the application server may communicate with each other normally.

When the fixup agent 2122 receives data from the application server, the fixup agent 2122 subtracts N from the protocol serial number of packet (for example, the serial number of TCP), and then transmits the packet to the TCP stack 260. When the fixup agent 2122 receives the response packet from the application server, the fixup agent 2122 subtracts M from the acknowledgement (ACK) number of packet, and then transmits the packet to the TCP stack 260. In this way, the electronic device 210 and the application server may communicate with each other normally.

Figure 5:
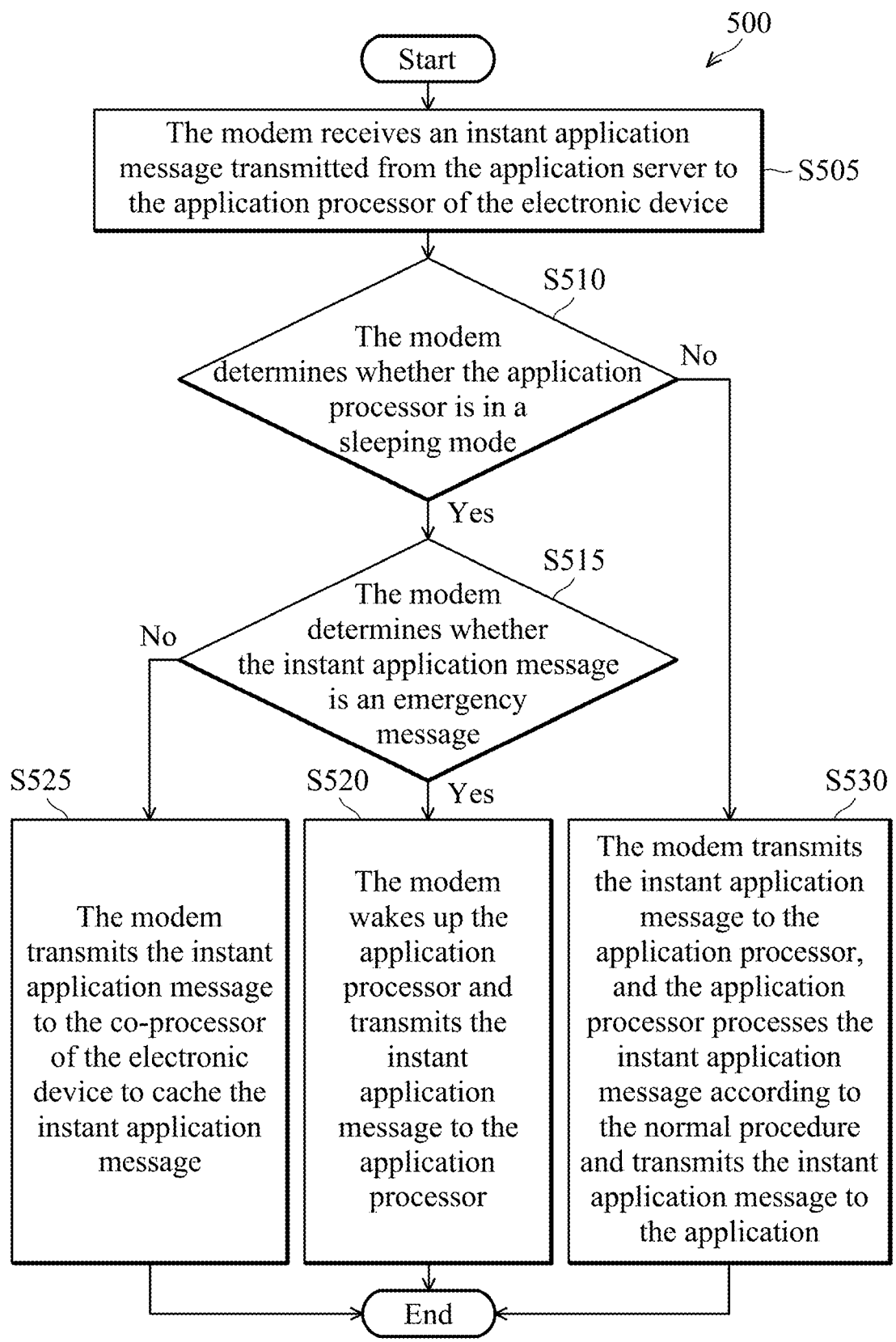
FIG. 5 is a flowchart illustrating a method for processing instant application messages according to the first embodiment of the present disclosure.

FIG. 5 is a flowchart illustrating a method 500 for processing instant application messages according to the first embodiment of the present disclosure. The method may be performed by the electronic device 210 of the system 200 as shown in FIG. 2.

Before the start of the process, the packet proxy in the co-processor of the electronic device has first set the packet mode according to the packet mode configuration transmitted by the application processor.

In step S505, the modem of the electronic device receives an instant application message transmitted from the application server to the application processor of the electronic device.

In step S510, the modem determines whether the application processor is in a sleeping mode. When the application processor is in the sleeping mode ("Yes" in step S510), in step S515, the modem determines whether the instant application message is an emergency message.

When the modem determines that the instant application message is an emergency message ("Yes" in step S515), in step S520, the modem wakes up the application processor and transmits the instant application message to the application processor, so that the application processor may process the instant application message instantly.

When the modem determines that the instant application message is not an emergency message ("No" in step S515), in step S525, the modem transmits the instant application message to the co-processor of the electronic device to cache the instant application message.

Returning to step S510, when the application processor is not in the sleeping mode ("No" in step S510), in step S530, the modem transmits the instant application message to the application processor, and the application processor processes the instant application message according to the normal procedure and transmits the instant application message to the application.

In one embodiment, in step S520, after the modem wakes up the application processor, the co-processor may transmit the synchronization proxy information to the application processor through a callback function, so that the fixup agent in the application processor may generate a protocol serial number balance according to the synchronization proxy information. Then, the co-processor pushes the cached instant application messages to the application processor, so that the application processor may process the cached instant application messages.

In one embodiment, in step S525, before the co-processor caches the instant application message, the co-processor may determine whether the instant application message is a heartbeat response. When the instant application message is a heartbeat response, the sending proxy of the co-processor may reply the heartbeat packet to the application server through the modem when the application processor is in the sleeping mode. When the instant application message is not a heartbeat response, the co-processor caches the instant application message to the message cache in the co-processor.

Second Embodiment

Figure 6:
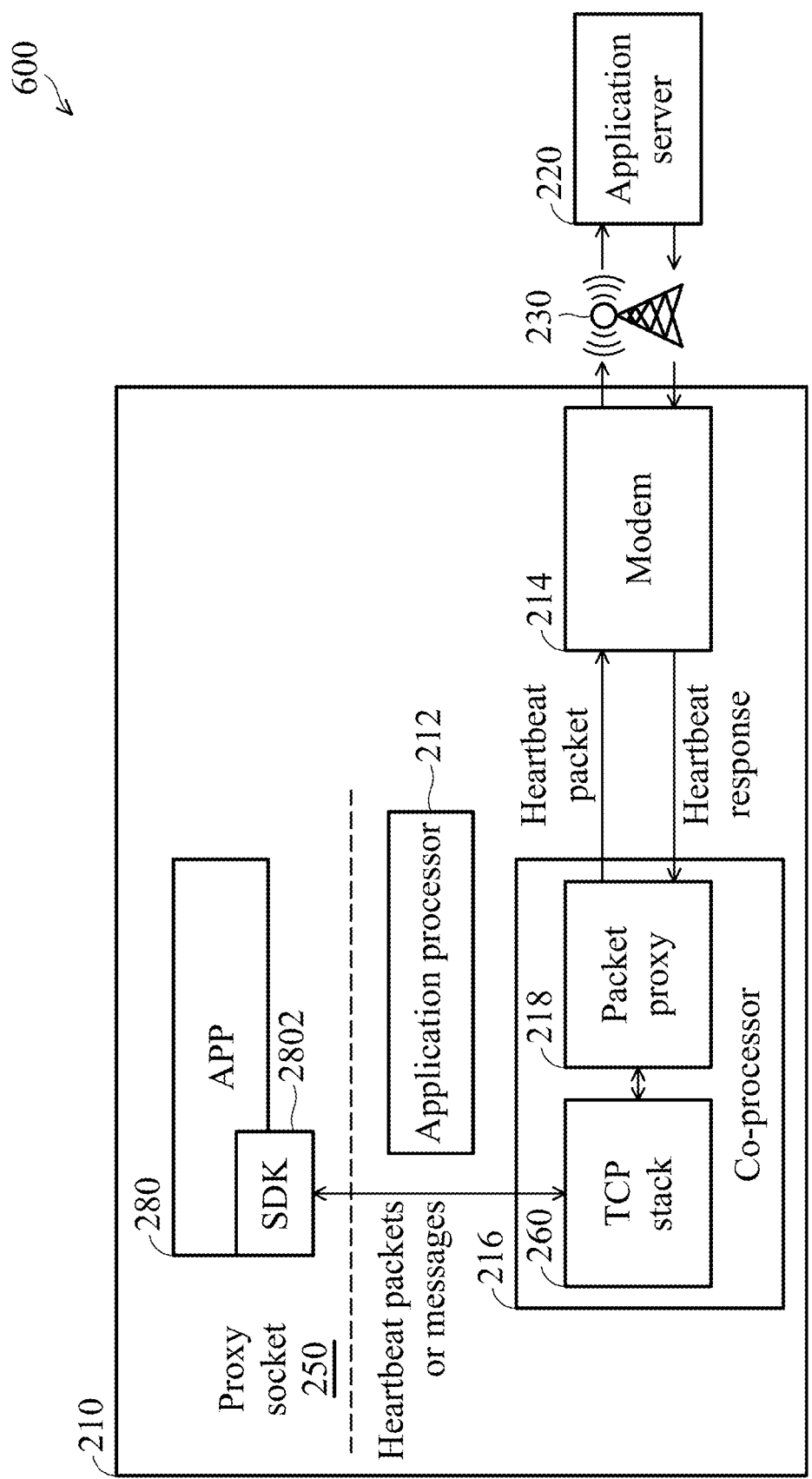
FIG. 6 is a schematic diagram illustrating a system for processing instant application messages according to the second embodiment of the present disclosure.

FIG. 6 is a schematic diagram illustrating a system 600 for processing instant application messages according to the second embodiment of the present disclosure. The difference from the first embodiment shown in FIG. 2 is that the application processor 212 in the system 600 for processing instant application messages shown in FIG. 6 does not comprise a fixup agent. In addition, since the TCP stack 260 is implemented by the co-processor 216 in the second embodiment, the application processor 212 does not need to generate the protocol serial number balance and process the cached instant application messages when the application processor 212 is awakened. The difference between the second embodiment and the first embodiment will be described in detail below. The components having the same name as described in FIG. 6 and FIG. 2 have the same function, so details related to the functions of the components will be omitted.

As shown in the FIG. 6, in the second embodiment, when the application processor 212 is in the sleeping mode, the modem 214 and the packet proxy 218 perform the same functions as the modem 214 and the packet proxy 218 in the first embodiment. The difference between the second embodiment and the first embodiment is that regardless of whether the application processor 212 is in a sleeping mode, the co-processor 216 transmits the heartbeat packets or messages to the proxy socket 250 of the application (APP) 280 through the TCP stack 260 (lightweight) or receives the heartbeat packets or messages sent from the proxy socket 250 without passing through the application processor 212, wherein the proxy socket 250 is provided by a software development kit (SDK) 2802 application programming interface (API). When the application processor 212 is in the working state, the application 280 communicates with the application server 220 through the TCP stack 260 of the co-processor 216. When the application processor 212 is in the sleeping mode, the co-processor 216 communicates with the application server 220 by itself, and caches non-emergency information, so that the application 280 may stay in the sleeping mode. When the application processor 212 is awakened from the sleeping mode, the co-processor 216 pushes the cached instant application messages to the application processor 212.

Figure 7:
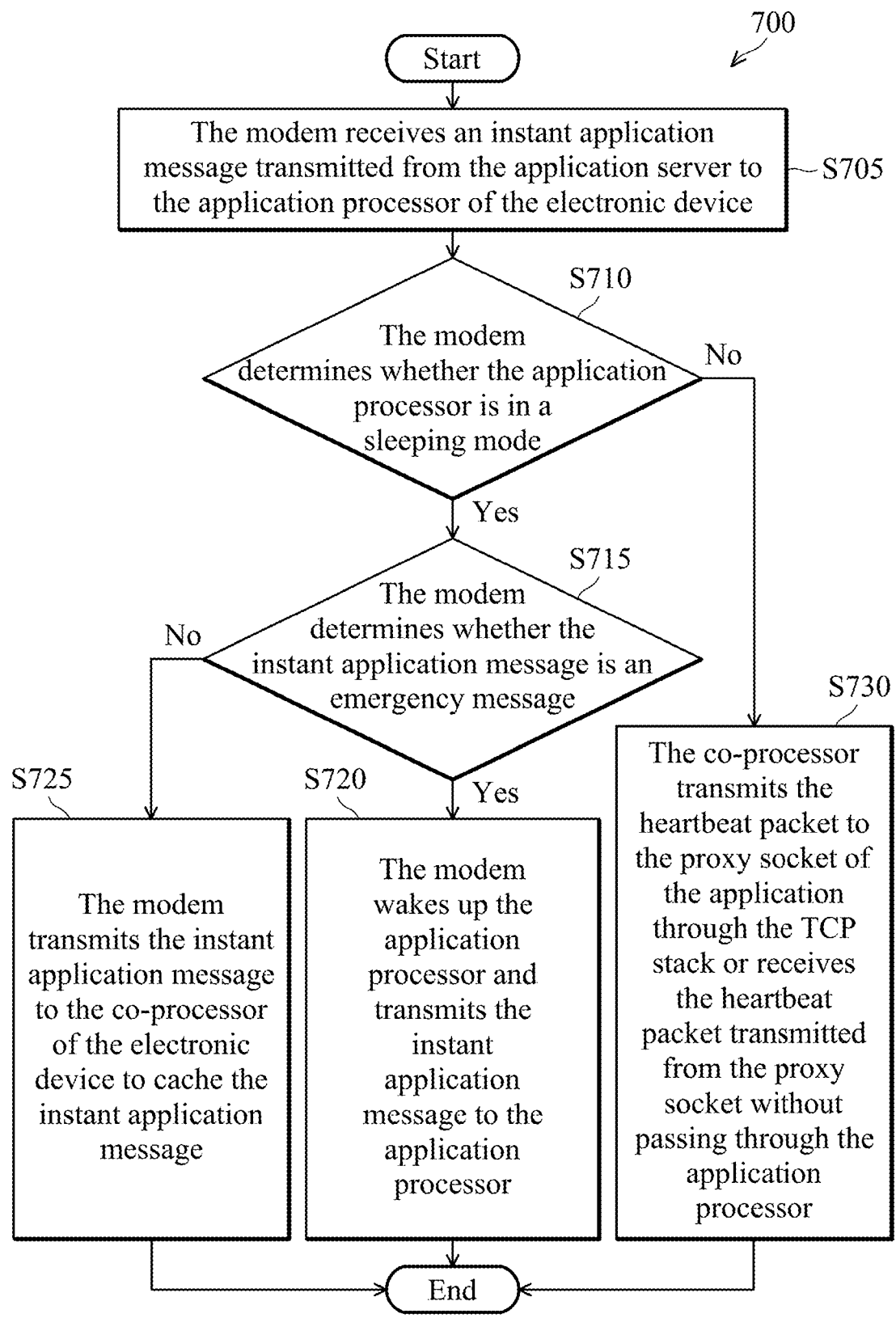
FIG. 7 is a flowchart illustrating a method for processing instant application messages according to the second embodiment of the present disclosure.

FIG. 7 is a flowchart illustrating a method 700 for processing instant application messages according to the second embodiment of the present disclosure. The method may be performed by the electronic device 210 of the system 200 as shown in FIG. 2.

In step S705, the modem of the electronic device receives an instant application message transmitted from the application server to the application processor of the electronic device.

In step S710, the modem determines whether the application processor is in a sleeping mode. When the application processor is in the sleeping mode ("Yes" in step S710), in step S715, the modem determines whether the instant application message is an emergency message.

When the modem determines that the instant application message is an emergency message ("Yes" in step S715), in step S720, the modem wakes up the application processor and transmits the instant application message to the application processor, so that the application processor may process the instant application message instantly.

When the modem determines that the instant application message is not an emergency message ("No" in step S715), in step S725, the modem transmits the instant application message to the co-processor of the electronic device to cache the instant application message.

Returning to step S710, when the application processor is not in the sleeping mode ("No" in step S710), in step S730, the co-processor transmits the heartbeat packet to the proxy socket of the application through the TCP stack or receives the heartbeat packet transmitted from the proxy socket without passing through the application processor.

In one embodiment, in step S725, before the co-processor caches the instant application message, the co-processor may determine whether the instant application message is a heartbeat response. When the instant application message is a heartbeat response, the TCP stack of the co-processor replies the heartbeat packet to the application server without passing through the application processor, and transmits the heartbeat packet to the proxy socket of the application or receives the heartbeat packet sent by the proxy socket. When the instant application message is not a heartbeat response, the co-processor caches the instant application message to the message cache in the co-processor.

Therefore, a method and a device for processing instant application messages are provided in the embodiments of the disclosure. The method and the device for processing instant application messages maintain the heartbeat connection with the application server through a low-power co-processor in the mobile device after the application processor is in a sleeping mode, which effectively reduces the number of times the mobile device is awakened, and achieves the purpose of reducing power consumption.

Figure 8:
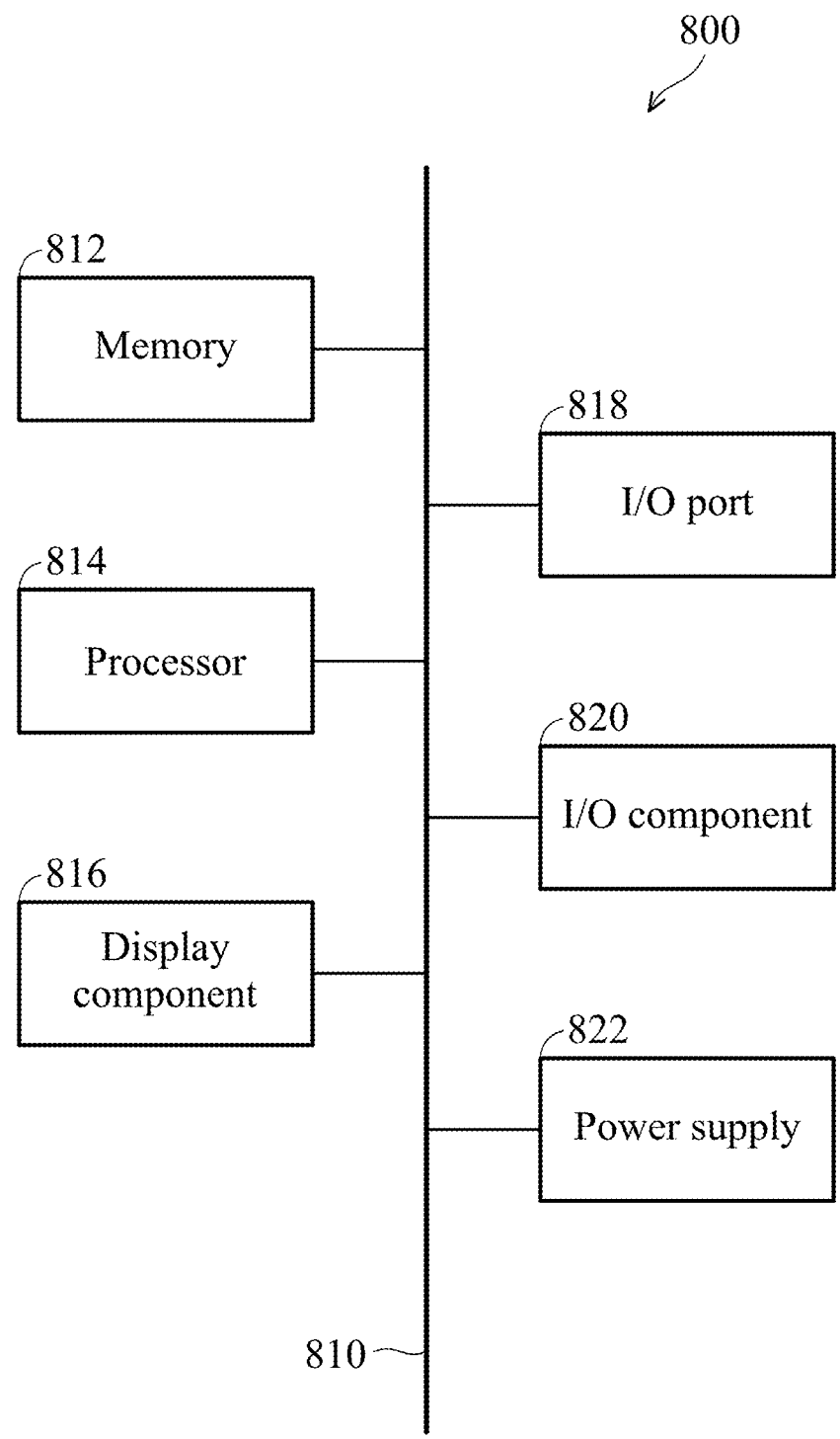
FIG. 8 illustrates an exemplary operating environment for implementing embodiments of the present disclosure.

Having described embodiments of the present disclosure, an exemplary operating environment in which embodiments of the present disclosure may be implemented is described below. Referring to FIG. 8, an exemplary operating environment for implementing embodiments of the present disclosure is shown and generally known as a computing device 800. The computing device 800 is merely an example of a suitable computing environment and is not intended to limit the scope of use or functionality of the disclosure. Neither should the computing device 800 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 8, the computing device 800 may include a bus 810 that is directly or indirectly coupled to the following devices: one or more memories 812, one or more processors 814, one or more display components 816, one or more input/output (I/O) ports 818, one or more input/output components 820, and an illustrative power supply 822. The bus 810 may represent one or more kinds of busses (such as an address bus, data bus, or any combination thereof). Although the various blocks of FIG. 8 are shown with lines for the sake of clarity, and in reality, the boundaries of the various components are not specific. For example, the display component such as a display device may be considered an I/O component and the processor may include a memory.

The computing device 800 typically includes a variety of computer-readable media. The computer-readable media can be any available media that can be accessed by computing device 800 and includes both volatile and nonvolatile media, removable and non-removable media. By way of example, not limitation, computer-readable media may comprise computer storage media and communication media. The computer storage media may include volatile and non-volatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 800. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 812 may include computer-storage media in the form of volatile and/or nonvolatile memory. The memory may be removable, non-removable, or a combination thereof. Exemplary hardware devices include solid-state memory, hard drives, optical-disc drives, etc. The computing device 800 includes one or more processors that read data from various entities such as the memory 812 or the I/O components 820. The display component(s) 816 present data indications to the user or to another device. Exemplary presentation components include a display device, speaker, printing component, vibrating component, etc.

The I/O ports 818 allow the computing device 800 to be logically coupled to other devices including the I/O components 820, some of which may be embedded. Illustrative components include a microphone, joystick, game pad, satellite dish, scanner, printer, wireless device, etc. The I/O components 820 may provide a natural user interface (NUI) that processes gestures, voice, or other physiological inputs generated by the user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 800, or any combination thereof. The computing device 800 may be equipped with depth cameras, such as stereoscopic camera systems, infrared camera systems, RGB camera systems, or any combination thereof, to realize gesture detection and recognition. Furthermore, the computing device 800 may be equipped with accelerometers or gyroscopes that enable detection of motion. The output of the accelerometers or gyroscopes may be provided to the display of the computing device 800 to carry out immersive augmented reality or virtual reality.

Furthermore, the processor 814 in the computing device 800 can execute the program code in the memory 812 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for processing instant application messages, wherein the method is performed by a device and comprises:
   receiving, by a modem of the device, an instant application message transmitted from an application server to an application processor of the device;
   determining, by the modem, whether the application processor is in a sleeping mode and the instant application message is an emergency message; and
   transmitting, by the modem, the instant application message to a co-processor of the device to cache the instant application message when the application processor is in the sleeping mode and the instant application message is not an emergency message.

2. The method for processing instant application messages as claimed in claim 1, wherein the method further comprises:
   determining, by the co-processor, whether the number of instant application messages that have been cached in the co-processor exceeds a threshold; and
   pushing, by the co-processor, the cached instant application messages to the application processor when the number of instant application messages exceeds the threshold.

3. The method for processing instant application messages as claimed in claim 2, wherein before the co-processor determines whether the number of instant application messages that have been cached in the co-processor exceeds the threshold, the method further comprises:
   determining whether the instant application message is a heartbeat response;
   sending, by a sending proxy of the co-processor, a heartbeat packet to the application server through the modem while the application processor is in the sleeping mode when the instant application message is a heartbeat response; or
   caching, by the co-processor, the instant application message to the message cache in the co-processor when the instant application message is not a heartbeat response.

4. The method for processing instant application messages as claimed in claim 1, wherein the method further comprises:
   operating, by the co-processor, one of the components of the device to notify a user of the instant application information when the application processor is in the sleeping mode.

5. The method for processing instant application messages as claimed in claim 1, wherein the method further comprises:
   receiving, by a sending proxy of the co-processor, a packet mode configuration transmitted by the application processor; and
   sending, by the sending proxy, a heartbeat packet back to the modem according to the packet mode configuration when the application processor is in the sleeping mode.

6. The method for processing instant application messages as claimed in claim 1, wherein the modem has a whitelist filter that records an emergency message mode; and
   wherein when the instant application message passes through the whitelist filter, the modem determines that the instant application message is an emergency message.

7. The method for processing instant application messages as claimed in claim 1, wherein when the application processor is not in the sleeping mode, the method further comprises:

directly transmitting, by the modem, the instant application message to the application processor; and transmitting, by the application processor, the instant application message to an application (APP).

8. The method for processing instant application messages as claimed in claim 1, wherein when the instant application message is an emergency message, the method further comprises:

waking up the application processor by the modem; and sending the instant application message to the application processor.

9. The method for processing instant application messages as claimed in claim 1, further comprising:

transmitting, by the co-processor, synchronization proxy information to the application processor through a callback function when the application processor is awakened from the sleeping mode;

generating, by a fixup agent of the application processor, a protocol serial number balance according to the synchronization agent information; and pushing, by the co-processor, the cached instant application message to the application processor;

wherein the protocol serial number balance is used to enable a transmission control protocol (TCP) stack to continue to communicate with the application server after the processor is awakened from the sleeping mode.

10. The method for processing instant application messages as claimed in claim 1, further comprising:

regardless of whether the application processor is in the sleeping mode, the co-processor transmits a heartbeat packet to a proxy socket of the application or receives the heartbeat packet transmitted from the proxy socket through the transmission control protocol (TCP) stack without passing through the application processor, wherein the proxy socket is provided by a software development kit (SDK) application programming interface (API); and the co-processor pushes the cached instant application message to the application processor after the application processor is awakened from the sleeping mode.

11. A device for processing instant application messages, comprising:

a modem;

an application processor, coupled to the modem; and a co-processor, coupled to the modem and the application processor;

wherein the modem receives an instant application message transmitted from an application server to the application processor;

the modem determines whether the application processor is in a sleeping mode and the instant application message is an emergency message; and the modem transmits the instant application message to the co-processor to cache the instant application message when the application processor is in the sleeping mode and the instant application message is not an emergency message.

12. The device for processing instant application messages as claimed in claim 11, wherein the co-processor further executes the following tasks:

determining whether the number of instant application messages that have been cached in the co-processor exceeds a threshold; and pushing the cached instant application messages to the application processor when the number of instant application messages exceeds the threshold.

13. The device for processing instant application messages as claimed in claim 12, wherein before the co-processor determines whether the number of instant application messages that have been cached in the co-processor exceeds the threshold, the co-processor further executes the following tasks:

determining whether the instant application message is a heartbeat response;

when the instant application message is a heartbeat response, a sending proxy of the co-processor sends a heartbeat packet to the application server through the modem while the application processor is in the sleeping mode; or when the instant application message is not a heartbeat response, the co-processor caches the instant application message to the message cache in the co-processor.

14. The device for processing instant application messages as claimed in claim 11, wherein the co-processor operates one of the components of the device to notify a user of the instant application information when the application processor is in the sleeping mode.

15. The device for processing instant application messages as claimed in claim 11, wherein the co-processor further executes the following tasks:

a sending proxy of the co-processor receives a packet mode configuration transmitted by the application processor; and the sending proxy sends a heartbeat packet back to the modem according to the packet mode configuration when the application processor is in the sleeping mode.

16. The device for processing instant application messages as claimed in claim 11, wherein the modem has a whitelist filter that records an emergency message mode; and wherein when the instant application message passes through the whitelist filter, the modem determines that the instant application message is an emergency message.

17. The device for processing instant application messages as claimed in claim 11, wherein when the application processor is not in the sleeping mode, the modem and the application processor further execute the following tasks:

the modem directly transmits the instant application message to the application processor; and the application processor transmits the instant application message to an application (APP).

18. The device for processing instant application messages as claimed in claim 11, wherein when the instant application message is an emergency message, the modem further executes the following tasks:

waking up the application processor; and sending the instant application message to the application processor.

19. The device for processing instant application messages as claimed in claim 11, wherein the application processor and the co-processor further execute the following tasks:

the co-processor transmits synchronization proxy information to the application processor through a callback function when the application processor is awakened from the sleeping mode;

a fixup agent of the application processor generates a protocol serial number balance according to the synchronization agent information; and the co-processor pushes the cached instant application message to the application processor;

wherein the protocol serial number balance is used to enable a transmission control protocol (TCP) stack to continue to communicate with the application server after the processor is awakened from the sleeping mode.

20. The device for processing instant application messages as claimed in claim 11, wherein the device further executes the following tasks:

regardless of whether the application processor is in the sleeping mode, the co-processor transmits a heartbeat packet to a proxy socket of the application or receives the heartbeat packet transmitted from the proxy socket through the transmission control protocol (TCP) stack without passing through the application processor, wherein the proxy socket is provided by a software development kit (SDK) application programming interface (API); and the co-processor pushes the cached instant application message to the application processor after the application processor is awakened from the sleeping mode.

\* \* \* \* \*